(12) United States Patent
Laido et al.

(10) Patent No.: US 8,374,658 B2
(45) Date of Patent: Feb. 12, 2013

(54) METHOD AND APPARATUS FOR FLAT AND TILT SLIDE MECHANISM

(75) Inventors: Rolf G. Laido, Poway, CA (US);
Kimmo Rantala, Ramona, CA (US);
Ron Chao, San Diego, CA (US)

(73) Assignee: Nokia Corporation, Espoo (FI)

( * ) Notice: Subject to any disclaimer, the term of this patent is extended or adjusted under 35 U.S.C. 154(b) by 200 days.

(21) Appl. No.: 12/767,196

(22) Filed: Apr. 26, 2010

(65) Prior Publication Data

US 2011/0263304 A1    Oct. 27, 2011

(51) Int. Cl.
*H04M 1/00* (2006.01)
(52) U.S. Cl. ................. 455/575.4; 379/428.01
(58) Field of Classification Search ............. 455/575.4, 455/575.3, 575.8; 379/330, 428.01
See application file for complete search history.

(56) References Cited

U.S. PATENT DOCUMENTS

| | | | | |
|---|---|---|---|---|
| 2002/0077161 | A1 | 6/2002 | Eromaki | 455/575 |
| 2009/0168369 | A1 | 7/2009 | Barnett | 361/727 |
| 2009/0227301 | A1 | 9/2009 | Lindvall | 455/575.4 |
| 2011/0195760 | A1* | 8/2011 | Carmonius et al. | 455/575.4 |

FOREIGN PATENT DOCUMENTS

| | | | |
|---|---|---|---|
| EP | 1 217 501 | A2 | 6/2002 |
| EP | 1 777 921 | A2 | 4/2007 |
| EP | 2 175 619 | A1 | 4/2010 |
| EP | 2 194 693 | A1 | 6/2010 |
| EP | 2 296 353 | A1 | 3/2011 |
| JP | 2000031654 | A1 | 1/2000 |
| TW | 286019 | B | 8/2007 |
| WO | WO-2008/056019 | A1 | 5/2008 |
| WO | WO 2009/155951 | A1 | 12/2009 |

OTHER PUBLICATIONS

"HTC TyTN Product Sheet", http://www.htc.com/uploadedFiles/Common/Product_Documents/UK/1766_TyTN_PRODSHT_FRNT.pdf, 1 pg.
"Nokia N97 Tech Specs", http://www.nokiausa.com/find-products/phones/nokia-n97/specifications, 7 pg.

* cited by examiner

*Primary Examiner* — Tu X Nguyen
(74) *Attorney, Agent, or Firm* — Harrington & Smith (57) ABSTRACT

In accordance with an example embodiment of the present invention, an apparatus is disclosed. The apparatus includes a first housing section, a second housing section, and a connection mechanism between the housing sections. The connection mechanism includes a first hinge member, a slide plate, second hinge member, a first hinge arm, and a second hinge arm. The first hinge member includes an elongated opening. The slide plate is attached to the second housing section. The second hinge member is connected to the slide plate. The first end of the first hinge arm is connected to the first housing section. The second end of the first hinge arm is connected to the second hinge member. The first end of the second hinge arm is connected to the first hinge member at the elongated opening. The second end of the second hinge arm is connected to the second hinge member.

21 Claims, 11 Drawing Sheets

METHOD AND APPARATUS FOR FLAT AND TILT SLIDE MECHANISM

TECHNICAL FIELD

The invention relates generally to an apparatus with a slide mechanism configured to provide a flat configuration and a tilt configuration, and an associated method.

BACKGROUND

Increasing computing power and new user interface solutions such as touch screens are transforming mobile phones into versatile and powerful mobile computers. In order to put these capabilities fully into productive use, sufficiently large user interface surfaces may be provided. However, users also expect devices to be compact and easy to carry. For these reasons, various two-part form factors are common. Two-part devices typically have a compact position in which some user interface elements are hidden, and an extended position, in which additional user interface elements are available.

SUMMARY

The foregoing and other problems are overcome, and other advantages are realized, by the use of the exemplary embodiments of this invention.

According to a first aspect of the present invention, an apparatus is disclosed. The apparatus includes a first housing section, a second housing section, and a connection mechanism. The connection mechanism is between the first housing section and the second housing section. The connection mechanism includes a first hinge member, a slide plate, second hinge member, a first hinge arm, and a second hinge arm. The first hinge member includes an elongated opening. The slide plate is fixedly attached to the second housing section. The second hinge member is slidably connected to the slide plate. The first hinge arm includes a first end and a second end. The first end of the first hinge arm is movably connected to the first housing section. The second end of the first hinge arm is movably connected to the second hinge member. The second hinge arm includes a first end and a second end. The first end of the second hinge arm is movably connected to the first hinge member at the elongated opening. The second end of the second hinge arm is movably connected to the second hinge member.

According to a second aspect of the present invention, an apparatus is disclosed. The apparatus includes a first housing section, a second housing section, and a connection mechanism. The first housing section includes a user input section. The second housing section includes a display. The connection mechanism is connected between the first housing section and the second housing section. The connection mechanism is configured to permit the second housing section to slide over at least a portion of the first housing section when the second housing section is moved from a closed position to a first open position. The connection mechanism is configured to permit the display to be in substantially the same plane as the user input section when the second housing section is moved to a second open position.

According to a third aspect of the present invention, a method is disclosed. A first housing section is provided. A first hinge member is connected to the first housing section. The first hinge member includes an elongated opening. A second housing section is provided. A slide plate is connected to the second housing section. A second hinge member is movably connected to the slide plate. A first hinge arm is connected between the first housing section and the second housing section. The first hinge arm includes a first end and a second end. The first end of the first hinge arm is at the first housing section. The second end of the first hinge arm is at the second hinge member. A second hinge arm is connected between the first housing section and the second housing section. The second hinge arm includes a first end and a second end. The first end of the second hinge arm is movably connected to the first hinge member at the elongated opening. The second end of the second hinge arm is connected to the second hinge member.

According to a fourth aspect of the present invention, a method is disclosed. A housing including a first housing section and a second housing section is provided. The first housing section includes a user input section. The second housing section includes a display. A connection mechanism is connected between the first housing section and the second housing section. The connection mechanism is configured to permit the second housing section to slide over at least a portion of the first housing section when the second housing section is moved from a closed position to a first open position. The connection mechanism is configured to permit the display to be in substantially the same plane as the user input section when the second housing section is moved to a second open position.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 12 of the drawings.

Figure 1:
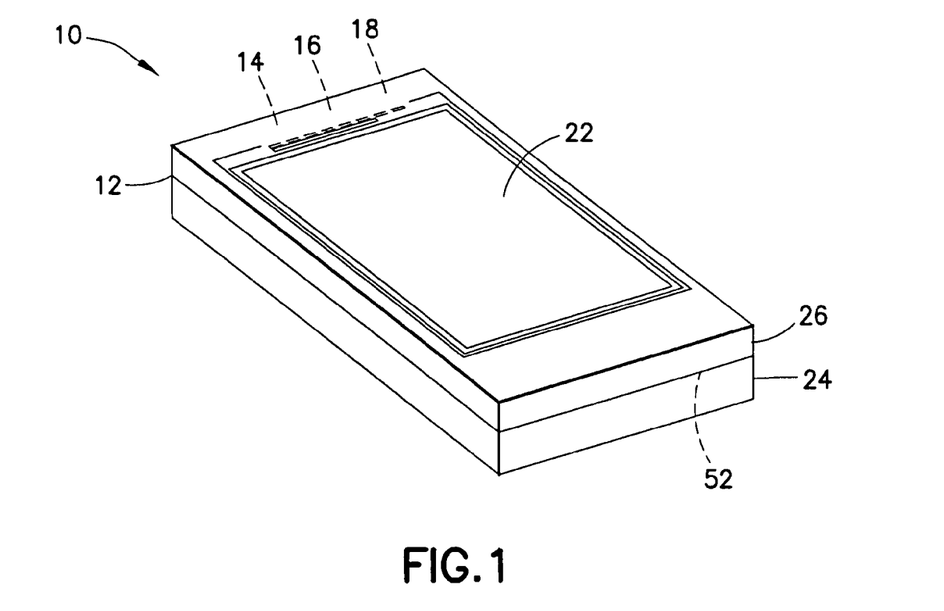
FIG. 1 is a perspective view of an electronic device in a closed position incorporating features of the invention.
Figure 2:
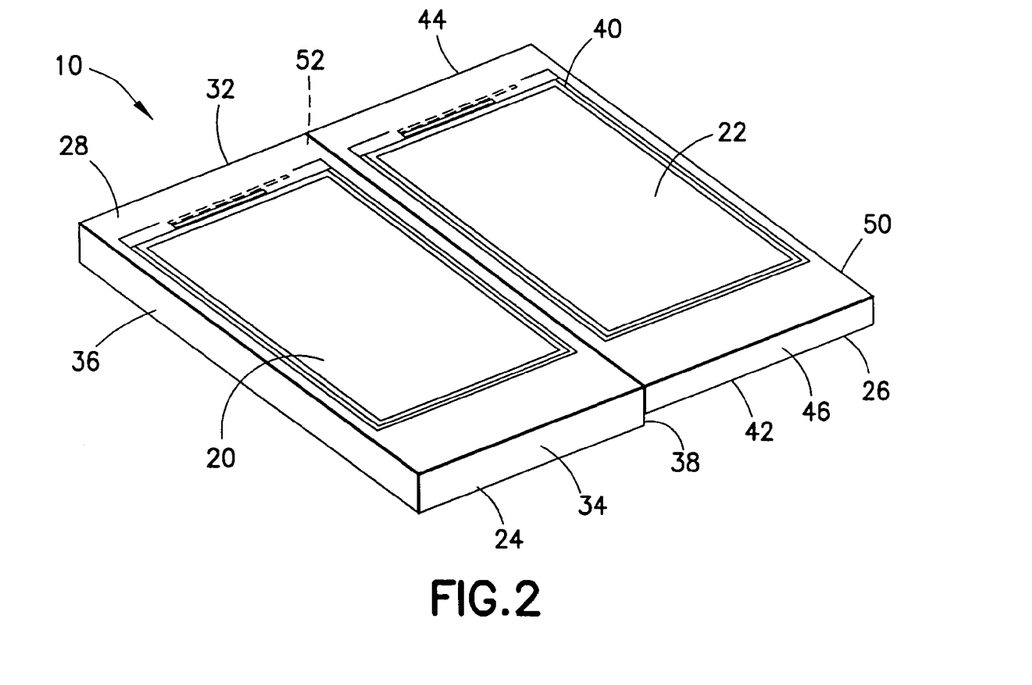
FIG. 2 is a perspective view of the electronic device shown in FIG. 1 in a fully open position.
Figure 3:
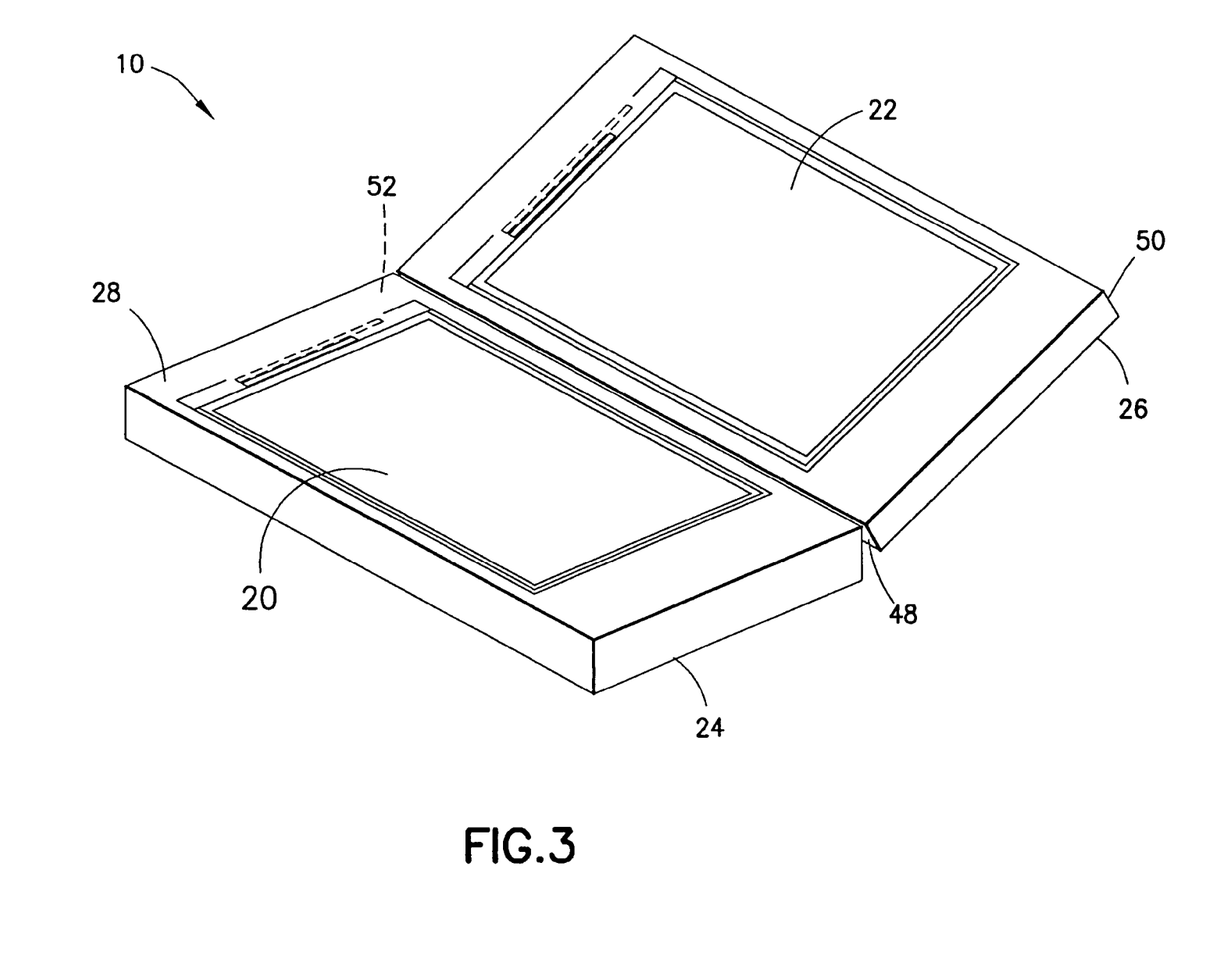
FIG. 3 is a perspective view of the electronic device shown in FIG. 1 in a tilt position.

Referring to FIG. 1-3, there are shown perspective views of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a mobile phone, a gaming device, a music player, a notebook computer, an electronic book reader, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory for example, within the housing 12, a user input region 20 and a display 22. The display 22 could also form a user input section, such as a touch screen. The housing 12 comprises a lower housing section 24 and an upper housing section 26. It should be noted that in alternate embodiments, more than two housing sections may be provided. Additionally, in alternate embodiments, the device 10 can have any suitable type of features as known in the art.

Figure 4:
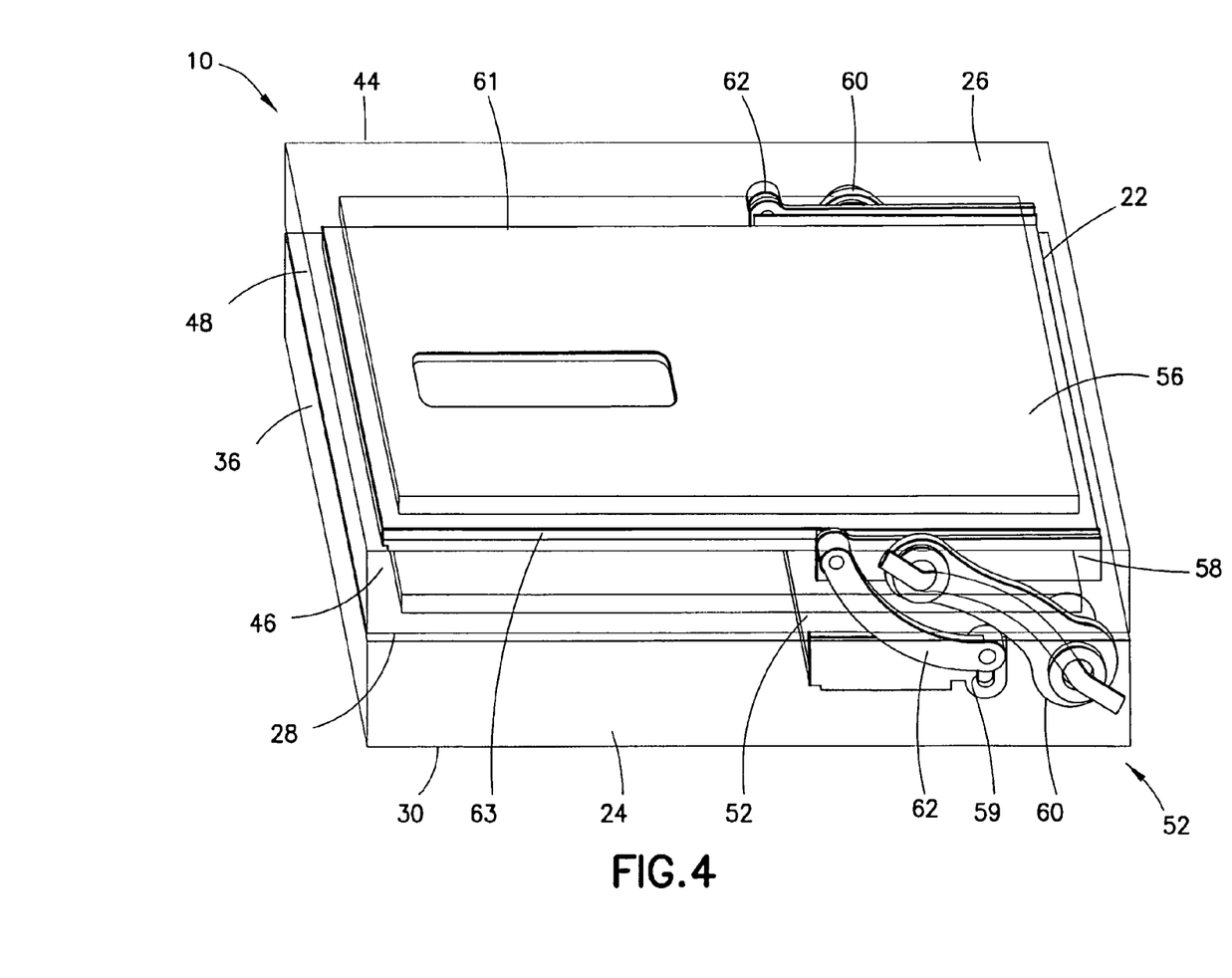
FIG. 4 is a perspective view of the electronic device shown in FIG. 1 (with transparent housing sections for the purposes of clarity)
Figure 5:
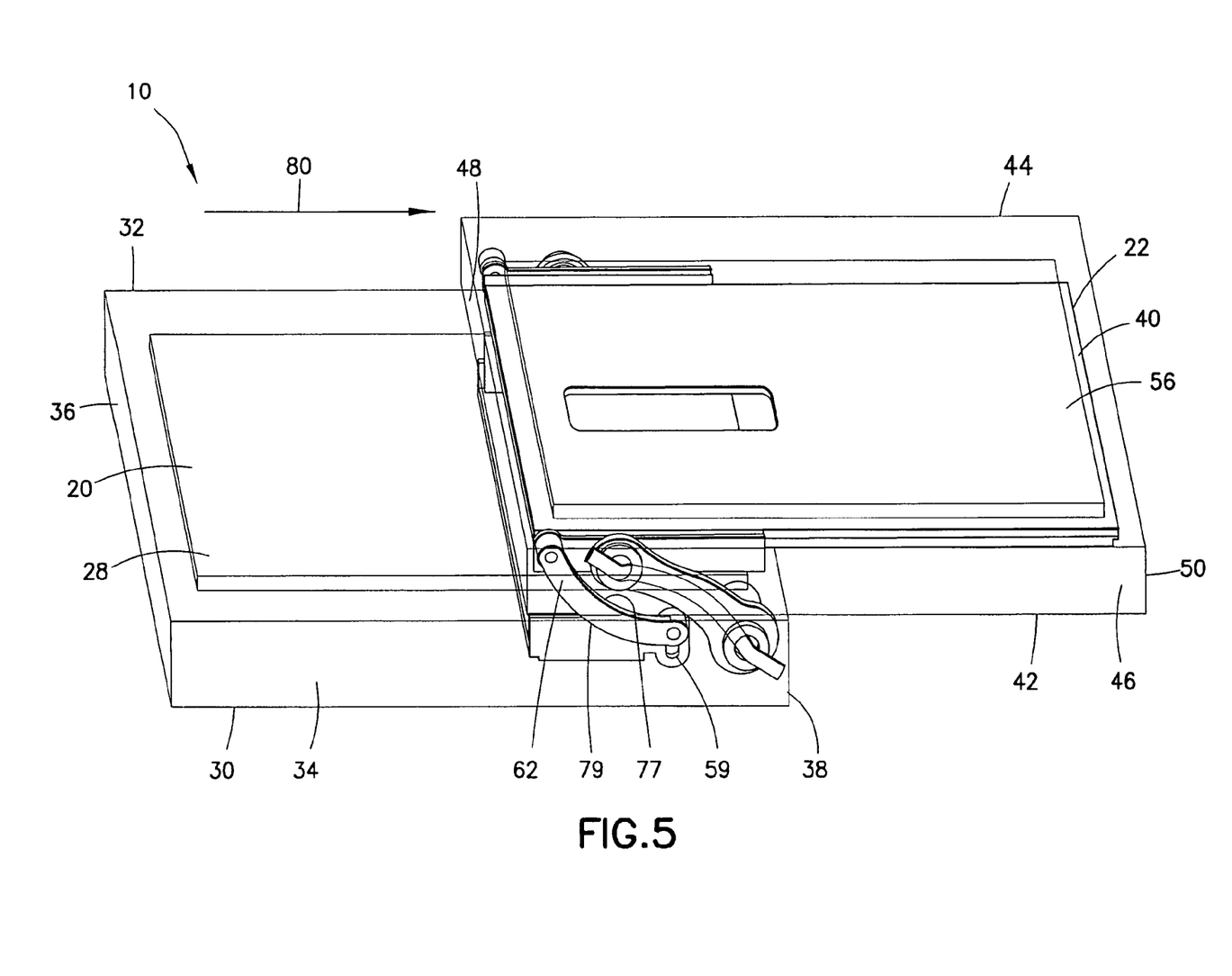
FIG. 5 is a perspective view of the electronic device shown in FIG. 1 in a first open position (with transparent housing sections for the purposes of clarity)
Figure 8:
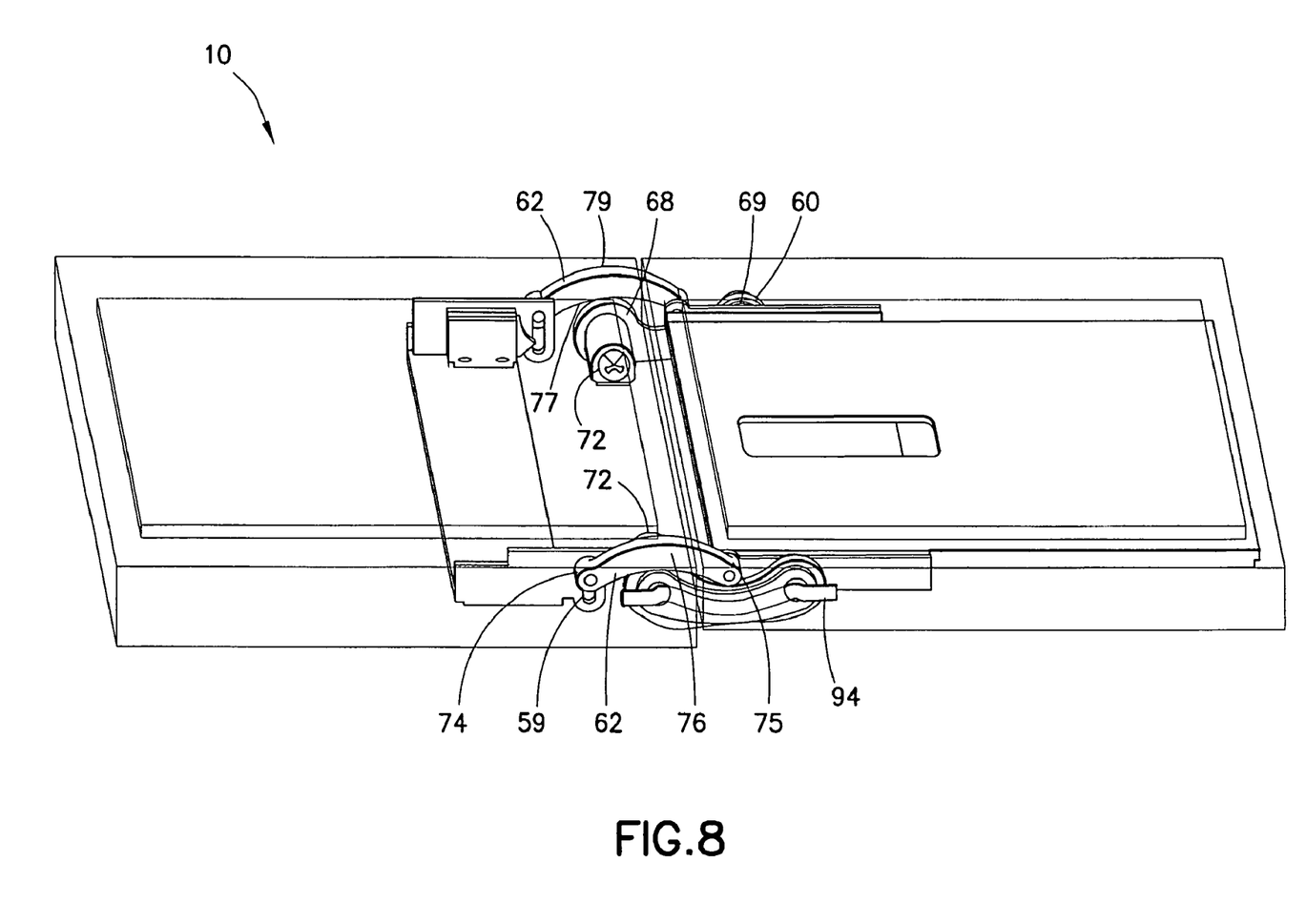
FIG. 8 is a perspective view of the electronic device shown in FIG. 1 in a fully open position (with transparent housing sections for the purposes of clarity)
Figure 9:
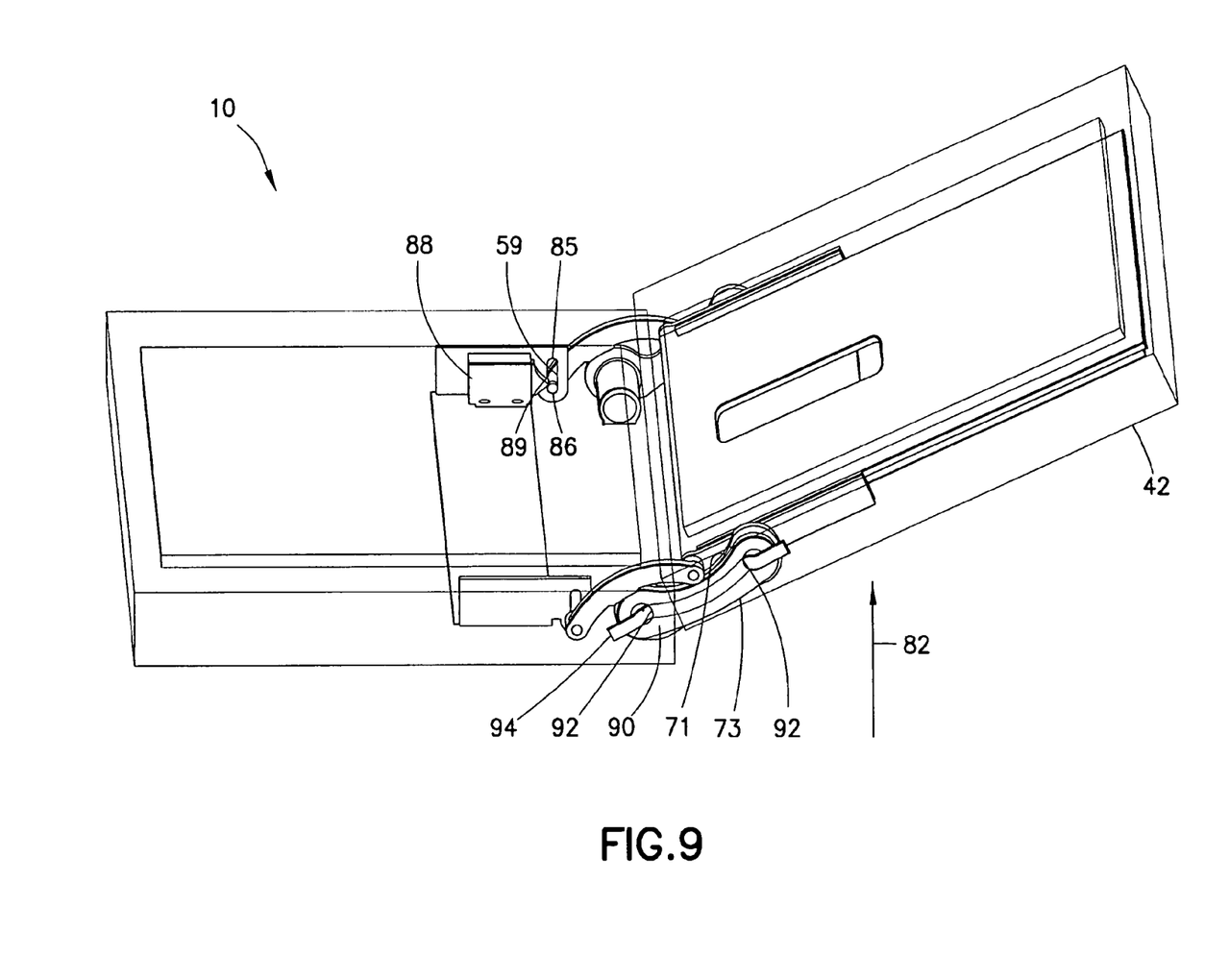
FIG. 9 is a perspective view of the electronic device shown in FIG. 1 in a tilt position (with transparent housing sections for the purposes of clarity)

Referring now also to FIGS. 4-9, the lower housing section 24 and the upper housing section 26 are movably connected to each other. In particular, the upper housing section 26 is movably connected to the lower housing section 24 between a closed position as shown in FIGS. 1, 4, a first open position as shown in FIG. 5, a fully open (or flat) position as shown in FIGS. 2, 8, and a tilted position as shown in FIGS. 3, 9.

The lower housing section 24 comprises an upper face 28 and an opposite lower face 30. According to some examples of the invention, the lower housing section 24 comprises the user input region 20 (which may be a touch screen display user input region, for example) at the upper face 28. In alternate embodiments, any suitable type of user input region and/or display may be provided at the upper face 28. The upper face 28 is substantially covered by the upper housing section 26 when the device 10 is in the closed position. When the device 10 is in the first open position, a portion of the upper face 28 forms a portion of a front face of the device 10. When the device 10 is in the fully open (or fully extended) position and the tilted position, the entire upper face forms a portion (such as about half, or about fifty percent, for example) of the front face of the device 10. The lower face 30 forms the back face of the device 10 when the device 10 is in the closed position. The lower face 30 forms a portion of the back face of the device 10 when the device 10 is in the first open, fully open, and tilted positions (such as about half, or about fifty percent, of the back face, for example, when the device is in the fully open or tilted position). Additionally, the lower housing section 24 comprises a top end 32, a bottom end 34, and lateral sides 36, 38 between the upper face 28 and the lower face 30. According to various exemplary embodiments of the invention, the upper and lower faces 28, 30 each comprise a substantially flat (or planar) configuration. However, in alternate example embodiments, any suitable surface shape/configuration may be provided.

The upper housing section 26 comprises an upper face 40 and an opposite lower face 42. According to some examples of the invention, the upper housing section 26 comprises the display 22 (which may be a touch screen display, for example) at the upper face 40. In alternate embodiments, a user input region may be provided at the upper face 40. However, it should be noted that any suitable configuration having a user input region and/or a display at the upper face may be provided.

The upper face 40 forms the front face of the device 10 when the device 10 is in the closed position (or closed configuration). The upper face 40 forms a portion of the front face of the device 10 when the device 10 is in the first open position (or first open configuration). The entire upper face 40 forms a portion (such as about half, or about fifty percent, for example) of the front face of the device 10 when the device 10 is in the fully open position (or fully open configuration) and the tilted position (or tilted configuration). The lower face 42 is substantially covered by the lower housing section 24 when the device 10 is in the closed position. When the device 10 is in the first open position, a portion of the lower face 42 forms a portion of the back face of the device 10. When the device 10 is in the fully open position and the tilted position, the entire lower face 42 forms a portion (such as about half, or about fifty percent, for example) of the back face of the device 10. Additionally, the upper housing section 26 comprises a top end 44, a bottom end 46, and lateral sides 48, 50 between the upper face 40 and the lower face 42. According to various exemplary embodiments of the invention, the upper and lower faces 40, 42 each comprise a substantially flat (or planar) configuration. However, in alternate example embodiments, any suitable surface shape/configuration may be provided.

The lower housing section 24 and the upper housing section 26 are connected to each other by a connection mechanism 52. The connection mechanism 52 comprises a first hinge member 54, a slide plate 56, a second hinge member 58, first hinge arms 60, and second hinge arms 62.

The first hinge member 54 comprises a base section 55 and two end sections 57. The first hinge member 54 may be fixedly attached to the lower housing section 24 in any suitable fashion, such as by fastening for example. The base section 55 may extend substantially parallel to the upper face 28 and the lower face 30 of the lower housing section 24. The end sections 57 extend from the base section 55 in a general cantilever fashion such that the end sections 57 are substantially perpendicular to base section 55. Each of the end sections 57 comprises an elongated opening (or slotted hole) 59. The elongated opening 59 is oriented substantially perpendicular to the upper and lower surfaces 28, 30 of the lower housing section 24. However, in alternate embodiments, any suitable orientation/configuration may be provided. The first hinge member 54 may comprise a one-piece member fabricated from any suitable material.

The slide plate 56 may comprise a generally flat planar shape. The slide plate 56 may be suitably sized and shaped to extend a majority of a distance between the lateral sides 48, 50 of the upper housing section 56. However, any suitable configuration may be provided. The slide plate 56 may be fixedly attached to the upper housing section 26 in any suitable fashion, such as by fastening for example. Additionally, the ends 61, 63 of the slide plate 56 are suitable sized and shaped to be slidably connected to the second hinge member 58. According to various exemplary embodiments of the invention, the ends 61, 63 are spaced proximate to the top end 44 and the bottom end 46 of the upper housing section 26. However, in alternate embodiments any suitable spacing may be provided. The slide plate 56 may comprise a one-piece member fabricated from any suitable material.

The second hinge member 58 comprises a base section 64 and two end sections 65. The second hinge member 58 is slidably attached to the slide plate 56 in any suitable fashion, such as by a slide rail configuration for example. The base section 64 extends between the ends 61, 63 of the slide plate 56. The end sections 65 extend from the base section 64 in a general cantilever fashion such that the end sections 65 are substantially perpendicular to base section 64. Each of the end sections 65 comprises a first opening 66 and a second opening 67. The second hinge member 58 may comprise a one-piece member fabricated from any suitable material.

The first hinge arms 60 are movably connected between the lower housing section 24 and the upper housing section 26. According to various exemplary embodiments of the invention, two first hinge arms 60 may be provided, however in alternate embodiments any suitable number of first hinge arms may be provided. Each of the first hinge arms 60 comprises a first end 68, an opposite second end 69, and a middle section 70 between the first end 68 and the second end 69. Each hinge arm 60 further comprises a general curved shape between the first end 68 and the second end 69. The first ends 68 of the first hinge arms 60 are pivotably connected to the lower housing section 24 by pivot connections 72 mounted to the lower housing section 24. However, it should be noted that any suitable connection between the first hinge arms 60 and the lower housing section 24 may be provided, such as a bearing connection for example. The second ends 69 of the first hinge arms 60 are pivotably connected to the second hinge member 58 at the first openings 66. Any suitable connection allowing for pivoting between the second end 69 of the first hinge arm 60 and the first opening 66 may be provided. The first hinge arms 60 are configured to pivot, or rotate, between the pivot connections 72 and the openings 66, in a direction 84. In particular, the first hinge arms 60 are configured to pivot within a plane substantially perpendicular to the upper surface 28 of the lower housing section 24.

The general curved shape of the first hinge arm 60 forms, at least partially, a concave portion and, at least partially, a convex portion. For example, according to various exemplary embodiments of the invention the first hinge arm 60 comprises a side 71 having a general concave shape over a majority of the side, and an opposite side 73 having general convex shapes proximate the ends 68, 69 with a substantially flat portion between the ends 68, 69 on the side 73. However in alternate embodiments the side 73 may comprise a general convex shape over a majority of the side 73. Additionally, it should be noted that the general concave and convex shapes at the sides of the first hinge arm are not required and any suitable shape and/or configuration may be provided.

The second hinge arms 62 are movably connected between the lower housing section 24 and the upper housing section 26. According to various exemplary embodiments of the invention, two second hinge arms 62 may be provided, however in alternate embodiments any suitable number of second hinge arms may be provided. Each of the second hinge arms 62 comprises a first end 74, an opposite second end 75, and a middle section 76 between the first end 74 and the second end 75. Each hinge arm 62 further comprises a general curved shape between the first end 74 and the second end 75. The first ends 74 of the second hinge arms 62 are pivotably connected to the elongated openings 59 of the first hinge member 54. As the elongated openings 59 comprise a general slot or racetrack shape, the first ends 74 of the second hinge arms 62 are also movably connected to the first hinge member 54 at the elongated openings 59 such that movement in a direction substantially perpendicular to the upper surface 28 of the lower housing section 24 may be provided. For example, according to some embodiments of the invention, the first end 74 of the second hinge arm 62 may comprise a pin 78 suitably sized and shaped to be received by the elongated hole 59. The pin configuration in the slotted hole allows for pivoting and movement between the ends 85, 86 of the slotted hole 59. However, it should be noted that any suitable connection between the second hinge arms 62 and the first hinge member 54 may be provided. The second ends 75 of the second hinge arms 62 are pivotably connected to the second hinge member 58 at the second openings 67. Any suitable connection allowing for pivoting between the second end 75 of the second hinge arm 62 and the second opening 67 may be provided. The second hinge arms 62 are configured to pivot, or rotate, between the elongated openings 59 and the openings 67, in the direction 84. In particular, the second hinge arms 62 are configured to pivot within a plane substantially perpendicular to the upper surface 28 of the lower housing section 24.

The general curved shape of the second hinge arm 62 forms, at least partially, a concave portion and, at least partially, a convex portion. For example, according to various exemplary embodiments of the invention the second hinge arm 62 comprises a side 77 having a general concave shape over a majority of the side 77, and an opposite side 79 having a general convex shape over a majority of the side 79. However it should be noted that the general concave and convex shapes at the sides 77, 79 of the second hinge arm 62 are not required and any suitable shape and/or configuration may be provided.

The first hinge arms 60 and the second hinge arms 62 comprise general curved configurations and are connected between the lower housing section 24 and the upper housing section 26 such that the curved shape of the first hinge arm 60 comprises a first orientation, and the curved shape of the second hinge arm 62 comprises a second, substantially opposite, configuration. These different orientations of the curved shapes provide for the concave sides 71 of the first hinge arms 60 to face the concave sides 77 of the second hinge arms 62.

To change the configuration of the device 10 (or the configuration of the upper housing section 26) from the closed position (as shown in FIGS. 1, 4) to the first open position (as shown in FIG. 5), a user may manipulate the device by sliding the upper housing section 26 relative to the lower housing section 24, which may be accomplished by pushing the lateral side 48 of the upper housing section 26 in a direction 80 towards the lateral side 38 of the lower housing section 24. The slide connection between the second hinge member 58 and the slide plate 56 is configured to provide substantially translational (or linear) motion in the direction 80 (along the plane parallel to the upper face 28 of the lower housing section 24). According to some embodiments of the invention, the movement of the upper housing section 26 from the closed position to the first open position may be provided solely by the slide connection between the second hinge member 58 and the slide plate 56, however, in alternate embodiments any suitable configuration may be provided.

In the closed position and the first open position, the orientation of the first hinge arms 60 and the second hinge arms 62 remains substantially the same. For example, in these positions the second end 69 of the first hinge arm 60 is proximate the middle section 76 of the second hinge arm 62, and the first end 74 of the second hinge arm 62 is proximate the middle section 70 of the first hinge arm 60.

Figure 6:
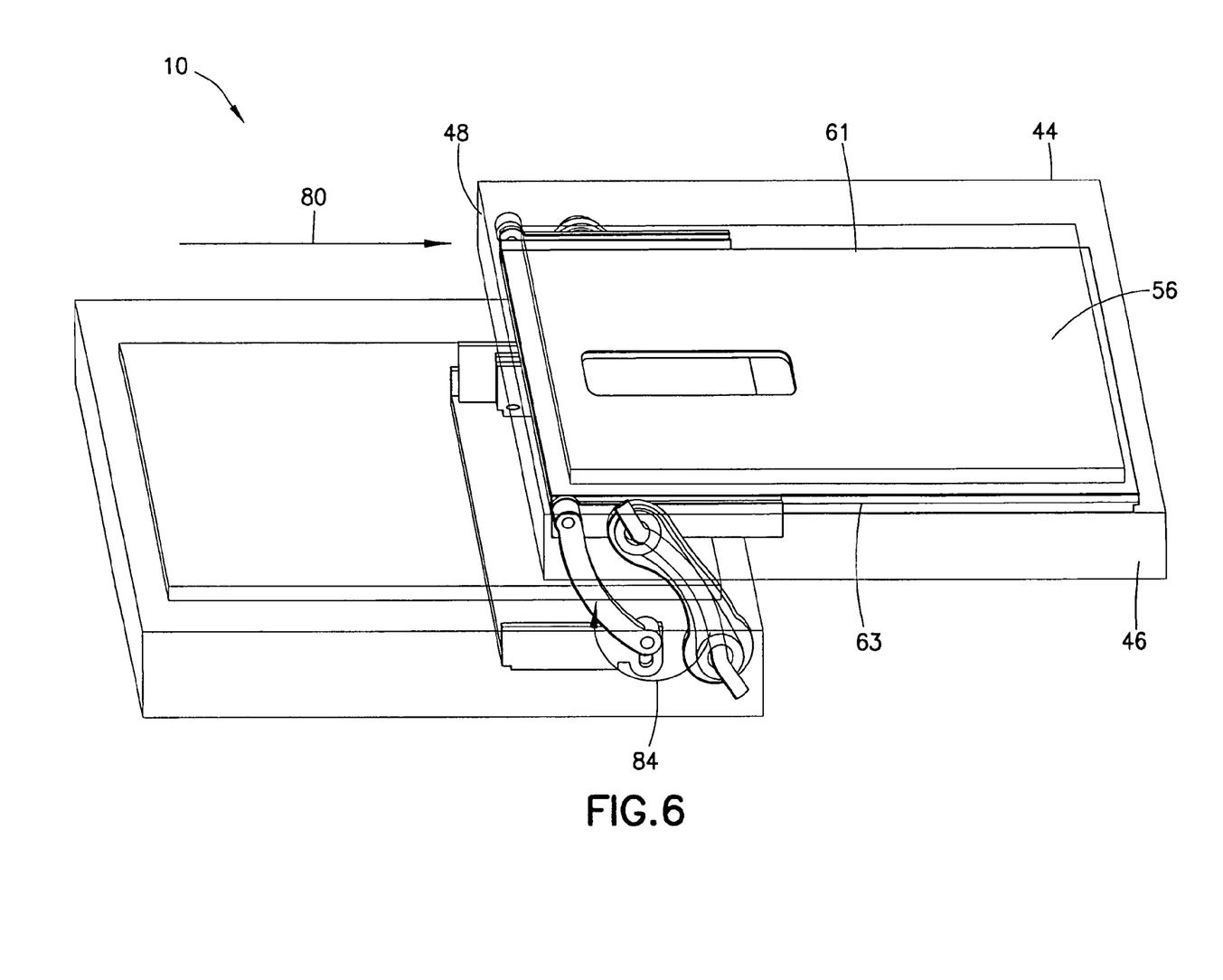
FIG. 6 is a perspective view of the electronic device shown in FIG. 1, between a first open position and a fully open position (with transparent housing sections for the purposes of clarity)

To change the configuration of the device 10 (or the configuration of the upper housing section 26) from the first open position (as shown in FIG. 5) to the fully open/extended position (as shown in FIGS. 2, 8), a user may manipulate the device 10 by sliding the upper housing section 26 relative to the lower housing section 24, which may be accomplished by further pushing of the lateral side 48 of the upper housing section 26 in the direction 80 towards the lateral side 38 of the lower housing section 24, such that the connection mechanism 52 lifts up, or raises, the upper housing section 26 in a direction away from the upper surface 28 of the lower housing section 24 as shown in FIG. 6. This lifting, or raising motion is provided by the rotational, or pivoting, motion of the first and second arm members 60, 62 in the direction 84.

Figure 7:
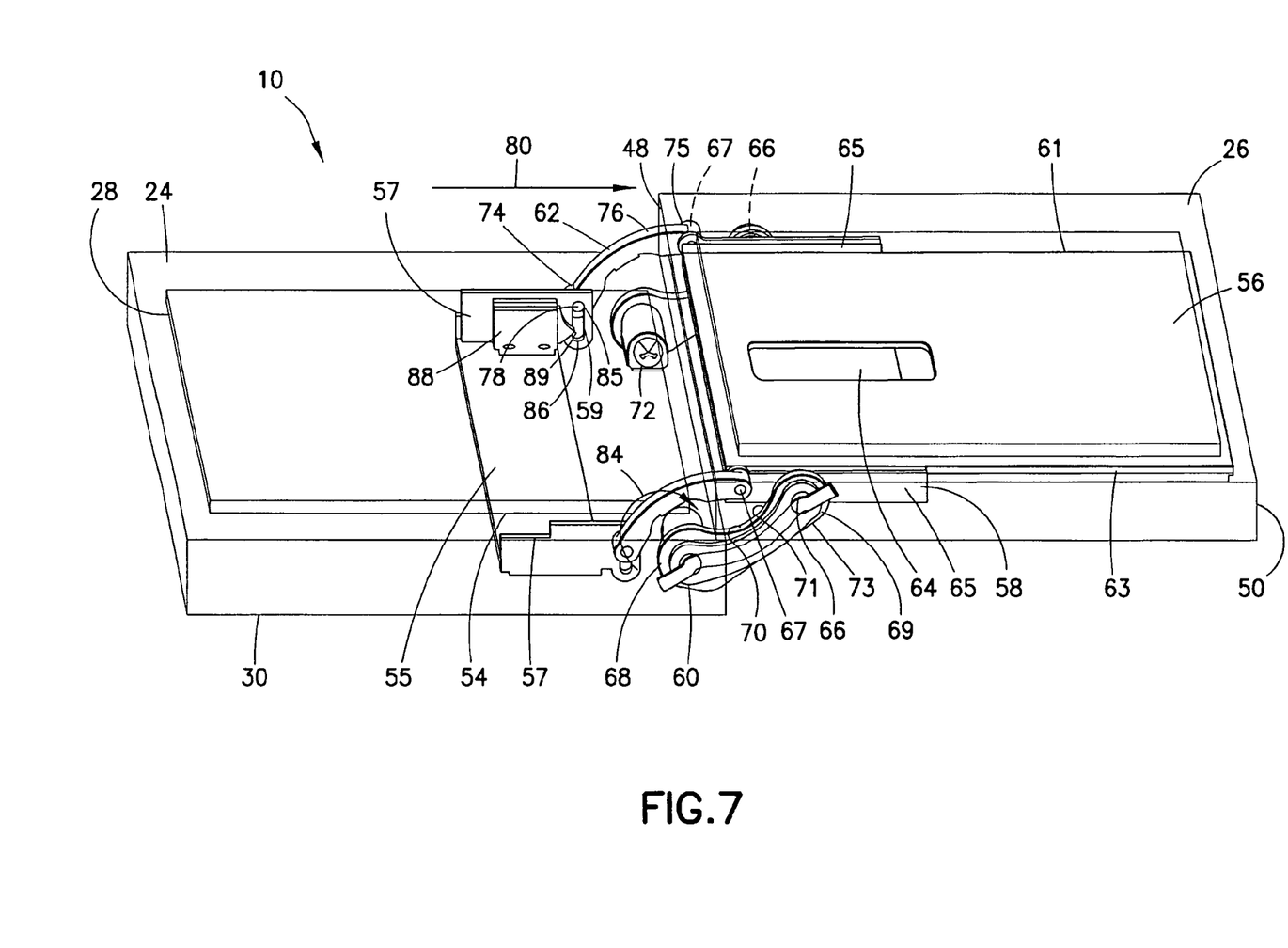
FIG. 7 is a perspective view of the electronic device shown in FIG. 1, between a first open position and a fully open position (with transparent housing sections for the purposes of clarity)

Further pushing of the lateral side 48 of the upper housing section 26 provides further rotation, or pivoting, of the hinge arms 60, 62 and movement of the upper housing section 26 as shown in FIG. 7.

Continued pushing of the lateral side 48 of the upper housing section 26 provides further rotation, or pivoting, of the hinge arms 60, 62 and movement of the upper housing section 26 such that the lateral side 48 of the upper housing section 26 moves beyond the lateral side 38 of the lower housing section 24 (in the direction 80) to the position as shown in FIGS. 2, 8. This movement of the upper housing section 26 to the fully open/extended position provides for the entire upper face 28 of the lower housing section 24 to be revealed (and accessible). The connection mechanism 52 is configured to provide a suitable movement between the housing sections 24, 26 such that the housing sections may be moved from a substantially stacked configuration to a substantially side by side configuration. Additionally, in this fully open position/configuration an edge of the upper surface 40 of the upper housing section 26 may be adjacent an edge of the upper surface 28 of the lower housing section 24 (as shown in FIGS. 2 and 8, for example) such that the display 20 is at substantially the same plane as the display 22. Further, according to various exemplary embodiments of the invention, the connection mechanism may be configured to lock the housing sections 24, 26 in this side by side configuration in any suitable manner, such as by magnets for example.

To change the configuration of the device 10 (or the configuration of the upper housing section 26) from the fully open/extended position (as shown in FIGS. 2, 8) to the tilted position (as shown in FIGS. 3, 9), a user may manipulate the device 10 by exerting a force on the lower surface 42 of the upper housing section 26 in a direction 82, such that a tilting of the upper housing section 26 relative to the lower housing section 24 is provided. This may be accomplished by a sliding movement at the connection of the first end 74 of the second hinge arm 62 at the elongated opening 59 of the first hinge member 54. For example when the first end 74 of the second hinge arm 62 moves, or slides, from the upper end 85 of the elongated hole 59 to the lower end 86 of the elongated hole 59, this provides a tilting motion of the upper housing section 26. Additionally, some embodiments of the invention may comprise a locking feature 88 having a projection 89 proximate the lower end 86 of the elongated opening 59. The locking feature 88 and projection 89 may be configured to lock (by an interference fit, for example) a portion (such as the pin 78 for example) of the second hinge arm 62 at the lower end 86 of the elongated opening 59 in order to maintain the tilted position (see FIG. 9). Additionally, in this tilted position/configuration an edge of the upper surface 40 of the upper housing section 26 may be adjacent an edge of the upper surface 28 of the lower housing section 24 (as shown in FIG. 3, for example).

In the fully open position and the tilted position, the orientation of the first hinge arms 60 and the second hinge arms 62 substantially rotates (from the orientation in the closed and first open positions). For example, in the fully open and the tilted positions the second end 75 of the second hinge arm 62 is proximate the middle section 70 of the first hinge arm 60, and the first end 68 of the first hinge arm 60 is proximate the middle section 76 of the second hinge arm 62.

Any suitable type of electrical connection between the lower housing section 24 and the upper housing section 26 may be provided. For example, according to various exemplary embodiments of the invention, the connection mechanism 52 may further comprise a hinge arm cover member 90 connected to the first hinge arm 60. The hinge arm cover member 90 may comprise an opening, or groove, 92 suitably sized and shaped to have a conductor, or flexible cable, 94 extend therethrough. However, various other suitable configurations comprising a flex cable, or flexible cable, (among other possible configuration types) may be utilized.

Some examples of the invention provide a device wherein various configurations are achievable by user manipulation of the housing sections, for example in one configuration/position (see FIG. 1, for example) the device may provide a closed mode, wherein only the display 22 is accessible. For example in another configuration/position the device may provide a first open mode (see FIG. 5, for example), wherein a portion of the display 20 is also accessible at the lower housing section. For example in yet another configuration/position, the device 10 may provide a second open mode (see FIG. 2, for example), wherein the two displays 20, 22 are substantially side by side and accessible. For example in another configuration/position the device may provide a third open mode (see FIG. 3, for example), further providing a tilted display.

While various embodiments of the invention have been described above in connection with a device having a tilt or tilted position, one skilled in the art will appreciate that the invention is not necessarily so limited and that other suitable configurations may be provided. For example, and referring now also to FIG. 10, there is shown a device 110 in accordance with another embodiment of the invention. The device 110 is similar to the device 10 and similar features are similarly numbered.

Figure 10:
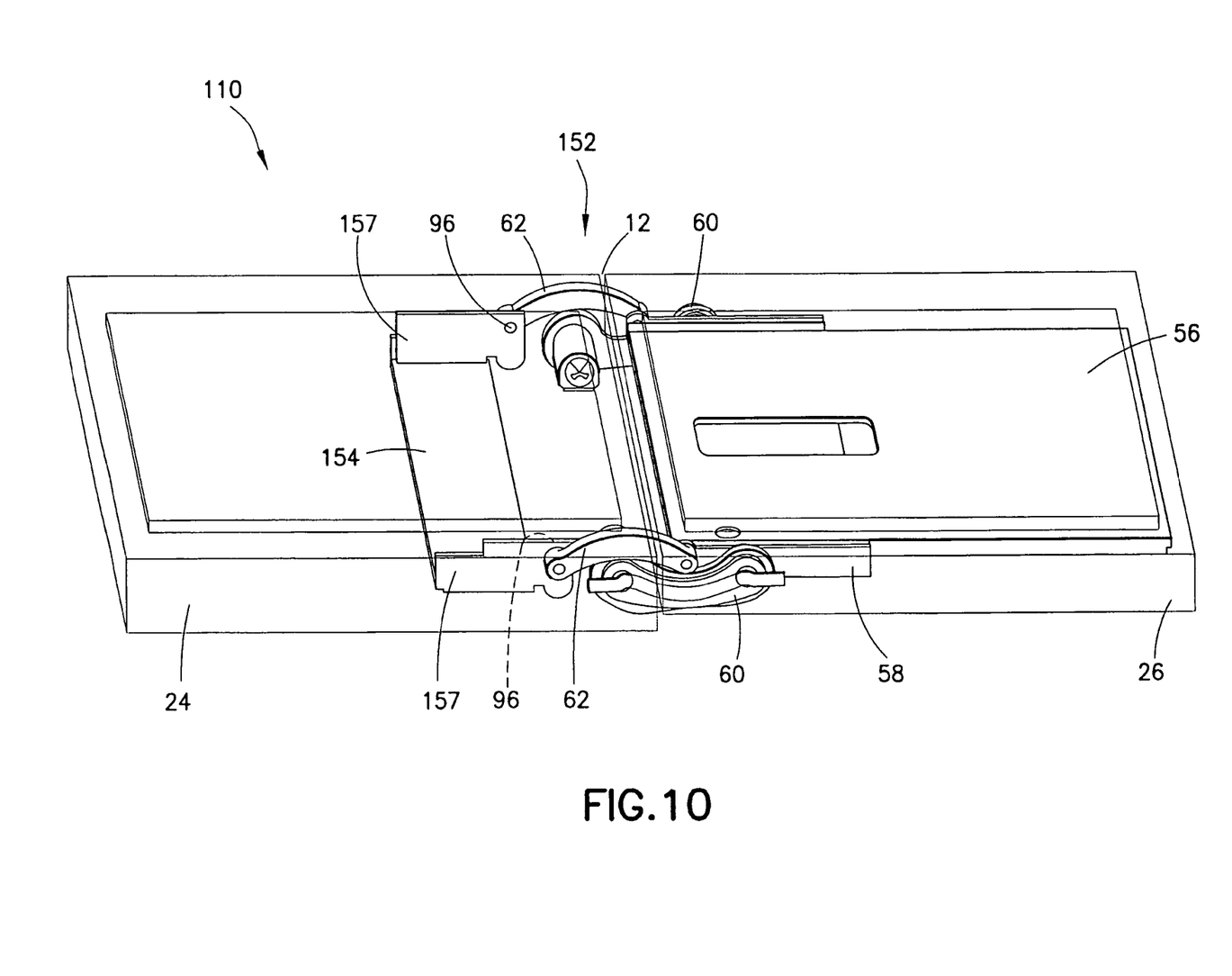
FIG. 10 is a perspective view of another electronic device incorporating features of the invention.

Similar to the device 10, the device 110 comprises a housing 12 having a lower housing section 24, an upper housing section 26 and a connection mechanism 152 connected between the lower housing section 24 and the upper housing section 26. However, in this embodiment the first hinge member 154 comprises holes 96 at the end sections 157 instead of the elongated openings 59. The openings 96 provide for substantially pivoting motion between the second hinge arm 62 and the first hinge member (with no sliding motion) 154, as the holes 96 do not comprise an elongated or slotted shape. This provides for the open positions as described above without the titled position. Accordingly, the locking feature is not provided in this configuration.

While various embodiments of the invention have been described above in connection with a device having first and second hinge arms which are configured to pivot, or rotate, in substantially the same plane (such as a plane substantially perpendicular to the upper surface of the lower housing section), one skilled in the art will appreciate that the invention is not necessarily so limited and that other suitable configurations may be provided. For example, and referring now also to FIG. 11, there is shown a device 210 in accordance with another embodiment of the invention. The device 210 is similar to the device 10 and similar features are similarly numbered.

Figure 11:
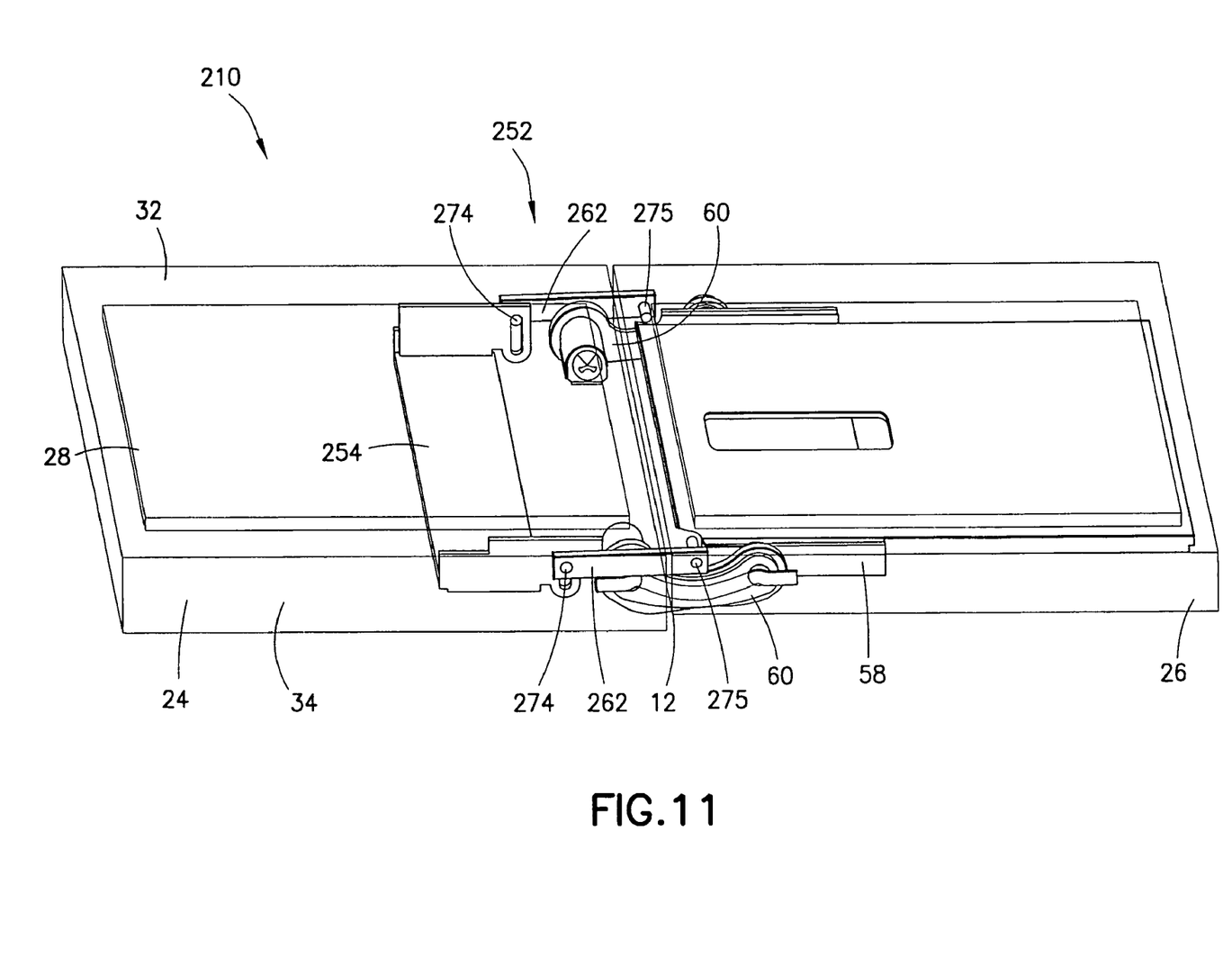
FIG. 11 is a perspective view of another electronic device incorporating features of the invention.

Similar to the device 10, the device 210 comprises a housing 12 having a lower housing section 24, an upper housing section 26 and a connection mechanism 252 connected between the lower housing section 24 and the upper housing section 26. However, in this embodiment the first hinge arms 60 and the second hinge arms 262 are spaced adjacently to one another such that the second hinge arms 262 are closer to the top end 32 and the bottom end 34 of the lower housing section 24 (and the first hinge arms 60 are between the second hinge arms 262). The second hinge arms 262 may be pivotably connected between the first hinge member 254 and the second hinge member 58 in any suitable fashion. This side by side, or adjacent, configuration of the hinge arms allows for the first hinge arms 60 to pivot, or rotate, in a plane substantially perpendicular to the upper surface 28 of the lower housing section 24, and allows for the second hinge arms 262 to pivot, or rotate, in a different plane substantially perpendicular to the upper surface 28 of the lower housing section 24. Accordingly, as the hinge arms 60, 262 are spaced side by side, any contact, or colliding, between the hinge arms 60, 262 may be minimized or prevented. Additionally, this side by side configuration may further allow for the hinge arms to comprise generally straight shapes between the ends of the hinges arms. For example in one embodiment, the hinge arms 262 comprise a substantially straight shape between the first end 274 and the second end 275. However, in alternate embodiments, any suitable configuration may be provided.

Figure 12:
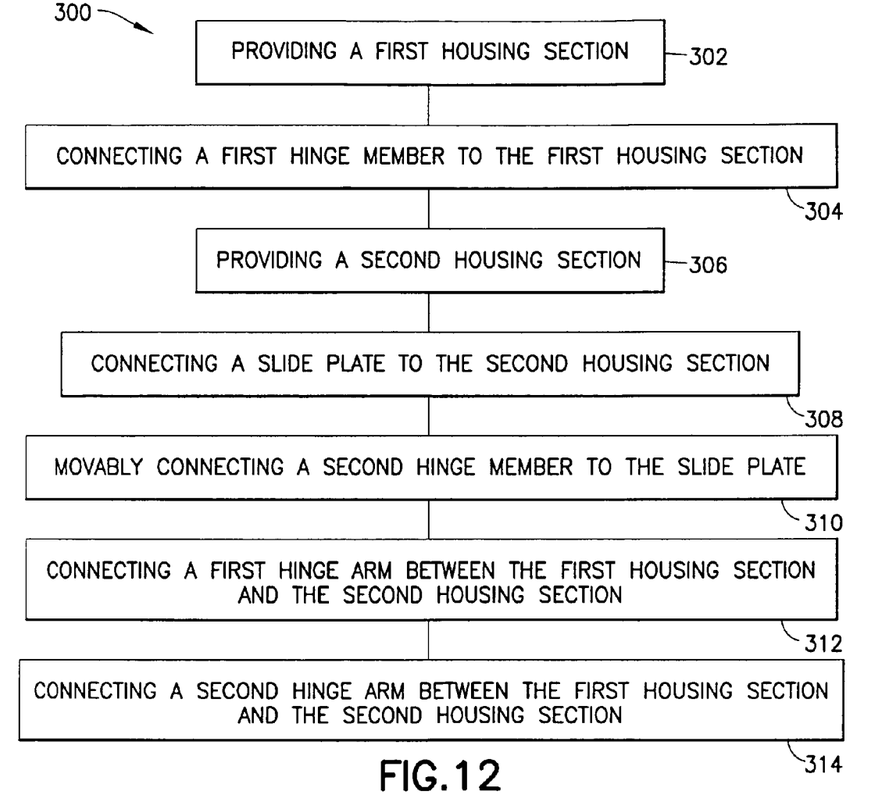
FIG. 12 is a block diagram of an exemplary method incorporating features of the invention.

FIG. 12 illustrates a method 300. The method 300 includes providing a first housing section (at block 302). Connecting a first hinge member to the first housing section, wherein the first hinge member comprises an elongated opening (at block 304). Providing a second housing section (at block 306). Connecting a slide plate to the second housing section (at block 308). Movably connecting a second hinge member to the slide plate (at block 310). Connecting a first hinge arm between the first housing section and the second housing section, wherein the first hinge arm comprises a first end and a second end, wherein the first end of the first hinge arm is at the first housing section, and wherein the second end of the first hinge arm is at the second hinge member (at block 312). Connecting a second hinge arm between the first housing section and the second housing section, wherein the second hinge arm comprises a first end and a second end, wherein the first end of the second hinge arm is movably connected to the first hinge member at the elongated opening, and wherein the second end of the second hinge arm is connected to the second hinge member (at block 314). It should be noted that the illustration of a particular order of the blocks does not necessarily imply that there is a required or preferred order for the blocks and the order and arrangement of the blocks may be varied. Furthermore it may be possible for some blocks to be omitted.

Figure 13:
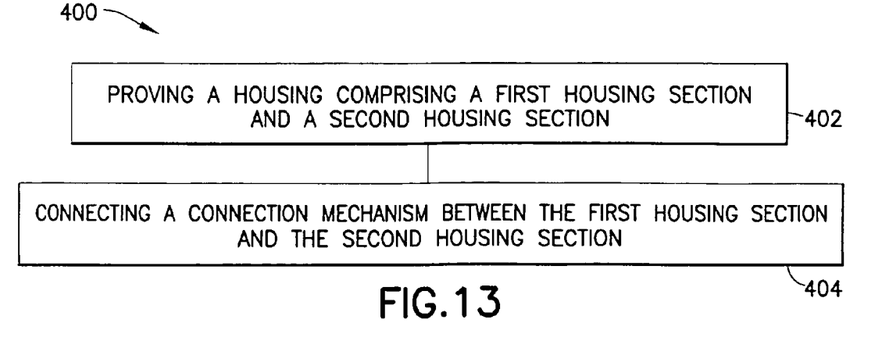
FIG. 13 is another block diagram of an exemplary method incorporating features of the invention.

FIG. 13 illustrates a method 400. The method 400 includes providing a housing comprising a first housing section and a second housing section, wherein the first housing section comprises a user input section, and wherein the second housing section comprises a display (at block 402). Connecting a connection mechanism between the first housing section and the second housing section, wherein the connection mechanism is configured to permit the second housing section to slide over at least a portion of the first housing section when the second housing section is moved from a closed position to a first open position, and wherein the connection mechanism is configured to permit the display to be in substantially the same plane as the user input section when the second housing section is moved to a second open position (at block 404). It should be noted that the illustration of a particular order of the blocks does not necessarily imply that there is a required or preferred order for the blocks and the order and arrangement of the blocks may be varied. Furthermore it may be possible for some blocks to be omitted.

Technical effects of any one or more of the exemplary embodiments provide a new type of mechanics solution for a two-part mobile device. Various embodiments of the invention allow slide form factor product to open flat (blocks side-by-side) and also to tilt from flat position. Additionally, some embodiments of the invention allow two similar size displays to be used either simultaneously when mechanism is "open" or only for use of one display when mechanism is in closed position.

According to various exemplary embodiments the connection mechanism comprises a first arm, the first arm (or first hinge arm) being connected to the two device parts with fixed connection points, and a second arm. The second arm (or second hinge arm) being connected to the two device parts in such a way that one connection point is movable in relation to the respective device part. The mechanism may be configured to provide a compact position, and an extended position in which the device parts form a flat user interface surface with minimal gap between the device parts. According to some embodiments of the invention, the device parts can also be tilted in relation to each other in the extended position.

The technical effects of any one or more of the exemplary embodiments provide an improved configuration when compared to conventional designs having two arms (or hinge arms). Various exemplary embodiments of the invention provide for combining sliding motion and rotational motion into one mechanism to allow a side-by-side slide and tilt form factor.

Without in any way limiting the scope, interpretation, or application of the claims appearing below, a technical effect of one or more of the example embodiments disclosed herein is that a device is provided wherein two large touch screen displays are accessible and stable when placed on a flat surface and the user touches upper display. Another technical effect of one or more of the example embodiments disclosed herein is that the upper display can be tilted for certain angle(s) in order to make movie watching convenient. Another technical effect of one or more of the example embodiments disclosed herein is that the connection mechanism allows for a fully open side-by-side position to maximize the two similar displays' size. Another technical effect of one or more of the example embodiments disclosed herein is added convenience to run two different applications (such as word processor and spread sheet application, for example) with the two displays, which may also allow for drag and drop operations between the two different applications. Another technical effect of one or more of the example embodiments disclosed herein is the curved shape configuration of the hinge arms allows for a compact and robust configuration.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to one example of the invention, an apparatus is disclosed. The apparatus includes a first housing section, a second housing section, and a connection mechanism. The second housing section is connected to the first housing section. The connection mechanism is between the first housing section and the second housing section. The connection mechanism comprises a first hinge member, a slide plate, second hinge member, a first hinge arm, and a second hinge arm. The first hinge member comprises an elongated opening. The slide plate is fixedly attached to the second housing section. The second hinge member is slidably connected to the slide plate. The first hinge arm comprises a first end and a second end. The first end of the first hinge arm is movably connected to the first housing section. The second end of the first hinge arm is movably connected to the second hinge member. The second hinge arm comprises a first end and a second end. The first end of the second hinge arm is movably connected to the first hinge member at the elongated opening. The second end of the second hinge arm is movably connected to the second hinge member.

According to another example of the invention, an apparatus is disclosed. The apparatus includes a first housing section, a second housing section, and a connection mechanism. The first housing section comprises a user input section. The second housing section comprises a display. The connection mechanism is connected between the first housing section and the second housing section. The connection mechanism is configured to permit the second housing section to slide over at least a portion of the first housing section when the second housing section is moved from a closed position to a first open position. The connection mechanism is configured to permit the display to be in substantially the same plane as the user input section when the second housing section is moved to a second open position.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a first housing section;
a second housing section; and
a connection mechanism between the first housing section and the second housing section, wherein the connection mechanism comprises a first hinge member, a slide plate, second hinge member, a first hinge arm, and a second hinge arm, wherein the first hinge member comprises an elongated opening extending through the first hinge member, wherein the elongated opening extends in a direction substantially perpendicular to upper and lower surfaces of the first housing section, wherein the slide plate is fixedly attached to the second housing section, wherein the second hinge member is slidably connected to the slide plate, wherein the first hinge arm comprises a first end and a second end, wherein the first end of the first hinge arm is movably connected to the first housing section, wherein the second end of the first hinge arm is movably connected to the second hinge member, wherein the second hinge arm comprises a first end and a second end, wherein the first end of the second hinge arm is movably connected to the first hinge member at the elongated opening, and wherein the second end of the second hinge arm is movably connected to the second hinge member.

2. An apparatus as in claim 1 wherein the first housing section comprises a first display and the second housing section comprises a second display.

3. An apparatus as in claim 1 wherein a lower surface of the second housing section is over an upper surface of the first housing section when the second housing section is in a first open position, wherein the lower surface of the second housing section is substantially parallel to and spaced from the upper surface of the first housing section when the second housing section is in a second open position, and wherein the lower surface of the second housing section is angled relative to the upper surface of the first housing section when the second housing section is in a third open position.

4. An apparatus as in claim 1 wherein the connection mechanism is configured to allow the second housing section to be adjacent the first housing section in one position, and wherein the connection mechanism is configured to allow the second housing section to be tilted towards the first housing section in another position.

5. An apparatus as in claim 1 wherein the first hinge arm comprises a middle section between the first end and the second end, wherein the second hinge arm comprises a middle section between the first end and the second end, wherein the second end of the first hinge arm is proximate the middle section of the second hinge arm when the apparatus is in a closed position, and wherein the first end of the first hinge arm is proximate the middle section of the second hinge arm when the apparatus is in an open position.

6. An apparatus as in claim 1 wherein the apparatus comprises a mobile phone.

7. An apparatus as in claim 1 wherein the first hinge arm and the second hinge arm each comprise a general curved shape along its length, wherein the general curved shape of the first hinge arm comprises a first orientation, and wherein the general curved shape of the second hinge arm comprises a second different orientation.

8. An apparatus as in claim 7 wherein the curved shape of the first hinge arm forms a concave side, wherein the curved shape of the second hinge arm forms a concave side, and wherein the concave side of the first hinge arm faces the concave side of the second hinge arm.

9. An apparatus as in claim 1 wherein the first hinge arm is adjacent to the second hinge arm such that the second hinge arm is spaced between the first hinge arm and a top end of the first housing section.

10. An apparatus, comprising:
a first housing section comprising a user input section at an upper surface of the first housing section;
a second housing section comprising a display; and
a connection mechanism connected between the first housing section and the second housing section, wherein the connection mechanism comprises an elongated opening extending through the connection mechanism, wherein the elongated opening extends in a direction substantially perpendicular to the upper surface of the first housing section, wherein the connection mechanism is configured to permit the second housing section to slide over at least a portion of the first housing section when the second housing section is moved from a closed position to a first open position, and wherein the connection mechanism is configured to permit the display to be in substantially the same plane as the user input section when the second housing section is moved to a second open position.

11. An apparatus as in claim 10 wherein the user input section comprises a touch screen display.

12. An apparatus as in claim 10 wherein the connection mechanism is configured to permit the display to be tilted relative to the user input section when the second housing section is moved to a third open position.

13. An apparatus as in claim 10 wherein the connection mechanism further comprises a first hinge arm connected between the first housing section and the second housing section, wherein the first hinge arm is configured to pivot within a plane substantially perpendicular to the plane of the user input section.

14. An apparatus as claim 13 further comprising a second hinge arm connected between the first housing section and the second housing section, wherein first hinge arm and the second hinge arm each comprise a general curved shape along its length, and wherein the second hinge arm is movably connected to the elongated opening of the connection mechanism.

15. A method, comprising:
providing a first housing section;
connecting a first hinge member to the first housing section, wherein the first hinge member comprises an elongated opening extending through the first hinge member, wherein the elongated opening extends in direction substantially perpendicular to upper and lower surfaces of the first housing section;
providing a second housing section;
connecting a slide plate to the second housing section;
movably connecting a second hinge member to the slide plate;
connecting a first hinge arm between the first housing section and the second housing section, wherein the first hinge arm comprises a first end and a second end, wherein the first end of the first hinge arm is at the first housing section, and wherein the second end of the first hinge arm is at the second hinge member; and
connecting a second hinge arm between the first housing section and the second housing section, wherein the second hinge arm comprises a first end and a second end, wherein the first end of the second hinge arm is movably connected to the first hinge member at the elongated opening, and wherein the second end of the second hinge arm is connected to the second hinge member.

16. A method as in claim 15 further comprising providing a first display at the first housing section and a second display at the second housing section.

17. A method as in claim 15 wherein the second housing section is adjacent to the first housing section when the second housing section is in an open position, and wherein the second housing section is tilted relative to the first housing section when the second housing section is in another open position.

18. A method, comprising:
providing a housing comprising a first housing section and a second housing section, wherein the first housing section comprises a user input section at an upper surface of the first housing section, and wherein the second housing section comprises a display; and
connecting a connection mechanism between the first housing section and the second housing section, wherein the connection mechanism comprises an elongated opening extending through the connection mechanism, wherein the elongated opening extends in a direction substantially perpendicular to the upper surface of the first housing section, wherein the connection mechanism is configured to permit the second housing section to slide over at least a portion of the first housing section when the second housing section is moved from a closed position to a first open position, and wherein the connection mechanism is configured to permit the display to be in substantially the same plane as the user input section when the second housing section is moved to a second open position.

19. A method as in claim 18 wherein the user input section comprises a touch screen display.

20. A method as in claim 18 wherein the connecting of the connection mechanism between the first housing section and the second housing section further comprises connecting a first hinge member to the first housing section, movably connecting a second hinge member to the second housing section, and connecting a hinge arm between the first hinge member and the second hinge member.

21. A method as in claim 18 wherein the second housing section is tilted relative to the first housing section when the second housing section is in a third open position.

* * * * *